Aug. 16, 1927.

W. V. VAN ETTEN 1,639,119

DIRIGIBLE HEADLIGHT

Filed Nov. 3, 1925

INVENTOR
WILLIAM V. VAN ETTEN
BY
Richard J Cook
ATTORNEY

Patented Aug. 16, 1927.

1,639,119

UNITED STATES PATENT OFFICE.

WILLIAM V. VAN ETTEN, OF EVERETT, WASHINGTON.

DIRIGIBLE HEADLIGHT.

Application filed November 3, 1925. Serial No. 66,482.

This invention relates to improvements in dirigible spotlights and more particularly to a device of that character designed for use on Chevrolet automobiles and which comprises a lamp mounting bracket that may be supported by the same bolts that secure the front fender supporting brace to the frame of the vehicle and wherein there is a spotlight mounting shaft rotatably supported in the bracket and adapted to be actuated by connection with the steering knuckle of the adjacent front wheel.

It is the principal object of the invention to provide a spotlight mounting and steering mechanism that may be attached without requiring any change or alteration in the parts of the vehicle as they are already provided and which may be easily and readily connected and will operate to cause the direction of the spotlight to be changed in accordance with the change in direction of travel of the vehicle.

In accomplishing these and other objects of the invention, I have provided the improved details of construction, the preferred forms of which are illustrated in the accompanying drawing, wherein—

Figure 1 is a front, perspective view of a part of an automobile as equipped with a dirigible spotlight embodied by the present invention.

Figure 2 is a perspective view of the spotlight mounting bracket and steering mechanism disconnected from the vehicle.

Figure 3 is a sectional view of the mounting bracket with the spotlight supporting shaft therein.

Figure 4 is a horizontal sectional view through the steering knuckle illustrating the manner of attaching the steering arm for the spotlight to the forward end of the knuckle steering arm.

Referring more in detail to the drawings—

1 designates the front axle of an automobile having a yoke 2 at its end in which a wheel steering knuckle 3 is mounted. The knuckle is equipped with a spindle 4 on which the ground wheel 5 is revoluble and has a steering arm 6 fixed therein by means of a nut 7 that is threaded onto the forward end of the arm after it has been extended through the knuckle, as shown in Figure 4.

Rigidly fixed to the forward end of the frame of the vehicle at one side by means of bolts 8 and 8' is an upwardly directed fender supporting brace bar 9.

The spotlight mounting bracket 10 comprises a base plate portion 10ª having apertures 11 therein for receiving the forward ends of the bolts 8 and 8' so that the bracket may be fixed rigidly in place by the same bolts and nuts that hold the fender brace in place. The bracket also comprises a horizontally turned and laterally directed plate 12 at its lower edge which, at its outer end has a vertical bearing sleeve 13 formed therewith.

Rotatable in the sleeve 13 is the upper end portion of a spotlight mounting shaft 14 which is held in the sleeve by means of a nut 14' which is threaded onto its upper end, and a coiled spring 15 is disposed between the upper end of the sleeve and the nut to absorb the vibration.

The shaft 14 extends somewhat below the sleeve and at its lower end has a forwardly directed arm 16 and at a point just below the sleeve has a forwardly directed spotlight mounting arm 17 to which a spotlight 18 is pivotally fixed.

The means provided by changing the direction of the spotlight in accordance with change of direction of travel of the vehicle consists of an arm 20 mounted adjacent the inside of the wheel 5 so as to extend forwardly from the knuckle 3 and having a laterally turned portion 21 provided with an aperture 22 for receiving the threaded, forward end portion of the steering arm 6 so that the nut 7 that holds the arm 6 in the knuckle may serve also to rigidly mount the arm 20. The forward end of the arm 20 and the forward end of the arm 16 are connected by a link 25 having universal toggle connections 26 at its ends with the said arms which permit relative vertical movement of the parts incidental to spring deflection.

It is apparent that with this connection the direction of the spotlight will be changed from side to side in accordance with change of direction of travel of the vehicle.

It is also apparent that the device may be easily and quickly attached and that various adjustments may be made to meet the requirements for causing the light to be directed downwardly to the center of the road or to one side thereof.

Having thus described my invention, what I claim as new therein and desire to secure by Letters Patent, is:

In a vehicle of the class described, a dirigible spotlight attachment comprising a bracket having a vertically disposed base plate provided with apertures for receiving bolts whereby it may be secured to the vehicle frame and having a horizontally turned and laterally directed portion at its lower edge provided with a vertical bearing sleeve, a shaft rotatably mounted in the sleeve and extending from the upper and lower ends thereof and provided with a shoulder engaging the lower end of the sleeve and terminating in a forwardly turned portion at its lower end, a spotlight mounting arm extending from the shaft adjacent the lower end of the sleeve, a coiled spring mounted about the upper end of the shaft and bearing against the upper end of the sleeve, and a nut on the shaft for tensioning the spring to hold the shoulder tightly against the lower end of the sleeve, an arm fixed to the steering knuckle of the vehicle and a link connecting this arm with the arm at the lower end of the shaft, by means of which the shaft will be rotated in accordance with movement of the steering knuckle.

Signed at Seattle, King County, Washington, this 30th day of September, 1925.

WILLIAM V. VAN ETTEN.